No. 874,267. PATENTED DEC. 17, 1907.
H. WAGNER.
MEANS FOR MOUNTING STONE LITHOGRAPHIC ROLLERS.
APPLICATION FILED DEC. 28, 1905.
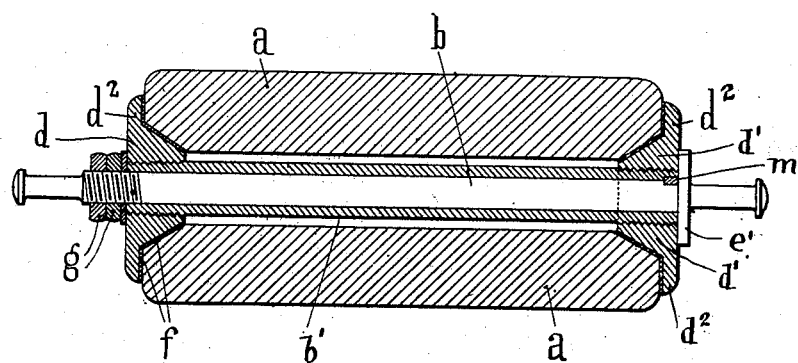
Witnesses:
Franklin E. Low
Emmett S. Ewing
Inventor:
Hubert Wagner.
by Ewing, Borth & Somer
Attys

UNITED STATES PATENT OFFICE.

HUBERT WAGNER, OF MUNICH, GERMANY, ASSIGNOR TO CHARLOTTENBURGER FARBWERKE AKTIEN GESELLSCHAFT, OF CHARLOTTENBURG, GERMANY.

MEANS FOR MOUNTING STONE LITHOGRAPHIC ROLLERS.

No. 874,267.  Specification of Letters Patent.  Patented Dec. 17, 1907.

Application filed December 28, 1905. Serial No. 293,563.

*To all whom it may concern:*

Be it known that I, HUBERT WAGNER, a subject of the King of Bavaria, and a resident of Munich, Ungererstrasse 58, Bavaria, Germany, have invented a certain new and useful Improvement in Means for Mounting Stone Lithographic Rollers; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My invention relates to improved means for mounting stone lithographic rollers one of the objects being to so mount the roller that while it is firmly supported and fixed on the shaft at its two ends it does not come into direct contact with the shaft passing through it. As compared with the ordinary manner of mounting such rollers, this arrangement possesses the advantage of securing a certain amount of elasticity between the shaft and the roller, in the bearing through the hollow part of the latter, thus preventing the bursting of same.

Another advantage of my invention is the provision whereby the roller may be removed and again easily replaced upon the shaft without the necessity of adjusting and centering the same. The roller being firmly locked upon the sleeve, it is only necessary to replace the sleeve upon the shaft, lock the same and the roller is ready for use.

The drawing shows a longitudinal, sectional view of one form of the invention.

In the form of my invention selected for illustration herein $a$ is the roller and $b$ the shaft upon which the same is mounted. The shaft $b$ is provided at or near one end with a collar or other convenient means against which the roller may be positioned and locked on the shaft. One or both ends of the shaft may be threaded and provided with nuts $g, g$, by which the roller may be firmly locked in position.

The sleeve or roller holder $b'$ is adapted to be slipped on the shaft and may be threaded at one or both ends to receive the locking members $d, d'$. If preferred, one of the locking members may be constructed integral with the sleeve $b'$, or it may be a separate member but firmly secured thereto and not adjustable. The sleeve $b'$ may be additionally secured against turning on the shaft by a key $m$ or other convenient means. In the present instance the locking members $d$ and $d'$ are provided with cone-shaped bearings to receive the ends of the roller, and this means serves to center and correctly position the roller while it is being locked on the shaft. These cone shaped bearings, together with the flanges $d^2$ at the outer edges of the locking members, provide broad bearing surfaces between which the roller may be securely locked.

If it is desired to use a roller made up of segments the locking members may be provided with an inturned flange at the outer edge, adapted to embrace the end of the roller and thus securely lock the segments in place both upon the shaft and also with respect to each other. If desired a packing member $f$ may be introduced between the ends of the roller and the locking members.

When the roller is to be mounted one of the locking members is secured to the end of the sleeve, the roller is slipped over the sleeve and the other locking member is then screwed onto the opposite end of the sleeve and tightened up against the end of the roller, thus firmly centering and locking the roller in position. The sleeve is then slipped onto the shaft, the nuts $g, g$ screwed tightly up against the locking member and the end of the sleeve, serving to tightly lock the sleeve itself against the shoulder $e'$.

When desired, the sleeve may be easily removed from the shaft by unlocking the nuts $g$ and the roller is removed with it but remains locked and centered upon the sleeve, so that when the roller is again needed it will not be necessary to adjust and center the roller, it being only necessary to slip the sleeve on the shaft and lock it in position.

It is to be understood that many modifications of the above construction may be made without departing from the spirit and scope of my invention.

Having thus described my invention, what I claim as new and desire to secure by Letters Patent of the United States of America, is:

1. A device of the character described comprising a shaft, a detachable roller holder, adjustable locking means for securing said holder to the shaft, roller locking members provided with broad locking surfaces, and means to secure said members to the roller holder.

2. A device of the character described comprising a shaft, a detachable roller holder, adjustable locking means to secure said holder upon the shaft, roller locking members and means to secure said members to the roller holder and also to adjust one locking member with respect to the other locking member.

3. A device of the character described comprising a shaft, roller locking members, adjustable locking means to secure said members to a shaft, including means whereby the roller and locking members may be removed from the shaft without unlocking the roller from the locking members and means to adjust one locking member with respect to the other locking member.

In testimony that I claim the foregoing as my invention, I have signed my name in presence of two subscribing witnesses.

HUBERT WAGNER.

Witnesses:
ULYSSES J. BYWATER,
MATHILDE K. HELD.